United States Patent
Kwon et al.

(10) Patent No.: US 8,524,420 B2
(45) Date of Patent: Sep. 3, 2013

(54) METHOD FOR PREPARING NANO-SIZED METAL PARTICLES ON A CARBON SUPPORT

(75) Inventors: Nak Hyun Kwon, Seoul (KR); Jae Seung Lee, Gyeonggi-do (KR); Bumwook Roh, Gyeonggi-do (KR); Yung-Eun Sung, Gyeonggi-do (KR); Tae-Yeol Jeon, Seoul (KR); Hee-Young Park, Gyeongsangnam-do (KR); Ju Wan Lim, Seoul (KR); Young-Hoon Chung, Gyeonggi-do (KR)

(73) Assignees: Hyundai Motor Company, Seoul (KR); SNU & R&DB Foundation, Seoul (KR)

( * ) Notice: Subject to any disclaimer, the term of this patent is extended or adjusted under 35 U.S.C. 154(b) by 555 days.

(21) Appl. No.: 12/779,375

(22) Filed: May 13, 2010

(65) Prior Publication Data
US 2011/0123908 A1   May 26, 2011

(30) Foreign Application Priority Data

Nov. 25, 2009   (KR) .................. 10-2009-0114623

(51) Int. Cl.
*H01M 4/02*   (2006.01)
(52) U.S. Cl.
USPC ........... 429/532; 502/261; 502/262; 977/748; 977/762
(58) Field of Classification Search
None
See application file for complete search history.

(56) References Cited

FOREIGN PATENT DOCUMENTS

| KR | 10-2006-0030591 | 4/2006 |
|---|---|---|
| KR | 10-0663893 | 8/2006 |
| KR | 10-2007-0001831 | 1/2007 |
| KR | 10-0738062 | 7/2007 |
| KR | 10-0774590 B1 | 11/2007 |
| KR | 10-0794386 | 1/2008 |
| KR | 10-0917697 | 6/2009 |

OTHER PUBLICATIONS

GmbH, H. Ultrasonic production of nano-size dispersions and emulsions, 2005, ENS'05, Paris, France, Dec. 14-16, 2005.*
Cushing, B.L., et al. Recent advances in the liquid-phase syntheses of inorganic nanoparticles, 2004, Chemical Reviews, vol. 104, pp. 3893-3946.*
Luo, H., et al. Surface oxidation of platinum-group transition metals in ambient gaseous environments: role of electrochemical versus chemical pathways, 2000, Journal of physical Chemistry, B. vol. 104(34), pp. 8250-8258.*
Mazumder et al. Oleylamine-mediated synthesis of Pd nanoparticles for catalytic formic acid oxidation, 2009, JACS, vol. 131 (13), pp. 4588-4589.*

* cited by examiner

*Primary Examiner* — Robert Xu
(74) *Attorney, Agent, or Firm* — Edwards Wildman Palmer LLP; Peter F. Corless

(57) ABSTRACT

Disclosed is a method for preparing nickel or palladium nanoparticles supported on a carbon support. To a mixture solution wherein a stabilizer is dissolved in 1,2-propanediol, a carbon support is added to prepare a dispersion. Then, a precursor solution wherein a nickel or palladium precursor dissolved in 1,2-propanediol is mixed therewith and stirred. Then, nickel or palladium nanoparticles supported on the carbon support are prepared by reduction. The disclosed method for preparing nickel or palladium nanoparticles supported on a carbon support allows preparation of nanoparticles with narrow particle size distribution and good dispersibility through a simple process and the resulting nickel or palladium nanoparticles may be usefully applied, for example, as electrode materials of fuel cells.

8 Claims, 3 Drawing Sheets

(a)

(b)

(a)

(b)

METHOD FOR PREPARING NANO-SIZED METAL PARTICLES ON A CARBON SUPPORT

CROSS-REFERENCE(S) TO RELATED APPLICATIONS

The present invention claims priority of Korean Patent Application No. 10-2009-0114623, filed on Nov. 25, 2009, which is incorporated herein by reference.

BACKGROUND

1. Technical Field

The present disclosure relates to a method for preparing nickel or palladium nanoparticles supported on a carbon support, which can be used as a catalyst or an electrode material of a fuel cell.

2. Description of Related Art

As a catalyst material, typically, a pure platinum, an alloy of platinum with other metals (e.g., palladium, nickel, and the like), or a surface alloy with a platinum layer formed thereon through heat treatment are used. However, as platinum is expensive and rare, researches have been actively carried out to provide platinum and/or other matal(s) having performance comparable to that of platinum in the form of nanoparticles having an increased surface area (see Stamenkovic, V. R. etc., *Science, vol.* 315, p. 493).

The so-called borohydride reduction method in which water or alcohol is used as a solvent and the so-called polyol method in which an alcohol solvent such as ethylene glycol or 1,2-propanediol is heated to induce dehydrogenation to reduce a metal precursor have been proposed to provide nanoparticles. These methods, however, have disadvantages. For example, nanoparticles tend to be agglomerated or are hardly formed on the surface of a carbon support. In addition, the metal precursor is not completely reduced or nanoparticles with high oxide content, which can decrease the catalytic activity, are formed.

Besides, other methods in which a solvent, a precursor, a reducing agent, etc. are used to support metal nanoparticles on carbon powder surface were proposed, as disclosed in Korean Patent Nos. 10-917697 and 10-738062, and Korean Patent Application Publication No. 10-2006-030591. They, however, are not suitable for large scale production because they require high-temperature heat treatment for reduction.

Accordingly, there is still a need for a new method for preparing nanoparticles.

The above information disclosed in this Background section is only for enhancement of understanding of the background of the invention and therefore it may contain information that does not form the prior art that is already known in this country to a person of ordinary skill in the art.

SUMMARY

One aspect of the present invention provides a method for preparing nickel or palladium nanoparticles, including: dissolving a stabilizer in 1,2-propanediol to prepare a mixture solution; adding a carbon support to the mixture solution and stirring to prepare a dispersion; dissolving a nickel or palladium precursor in 1,2-propanediol to prepare a precursor solution, and mixing the precursor solution with the dispersion and stirring to prepare a dispersed precursor solution; evaporating trace water contained in the dispersed precursor solution; reducing the metal precursor in the dispersed precursor solution to prepare nanoparticles; and washing and drying the nanoparticles to obtain the nanoparticles as powder.

According an embodiment, the metal is nickel or palladium.

The metal nanoparticles according to the present invention show narrow particle size distribution and can be prepared through a simple process without reduction at high temperature. They are useful as catalysts or electrode materials of fuel cells.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features will be described in detail below.

BRIEF DESCRIPTION OF THE DRAWINGS

FIG. 2 (*b*) shows a TEM image of 21.1 wt % Ni nanoparticles supported on carbon black;

FIG. 3 (*b*) shows a powder diffraction pattern of 21.1 wt % Ni nanoparticles.

DESCRIPTION OF SPECIFIC EMBODIMENTS

Figure 1:
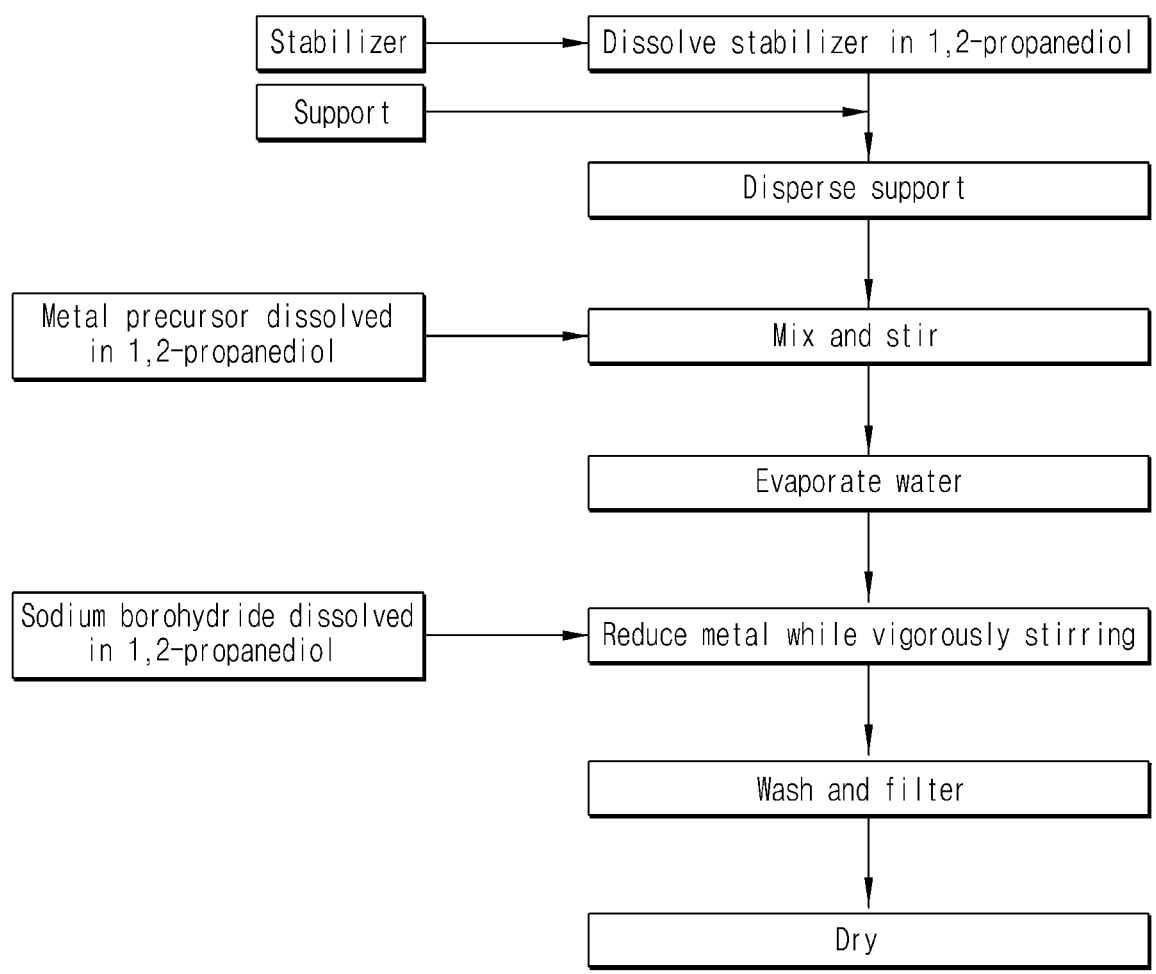
FIG. 1 schematically illustrates a process for preparing nickel (Ni) or palladium (Pd) nanoparticles using carbon black as a support.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a method for preparing metal nanoparticles, comprising: dissolving a stabilizer in a solvent to prepare a mixture solution; adding a carbon support to the mixture solution and stirring to prepare a dispersion; dissolving a metal precursor in a solvent to prepare a precursor solution, and mixing the precursor solution with the dispersion and stirring to prepare a dispersed precursor solution; evaporating trace water contained in the dispersed precursor solution; reducing the metal precursor in the dispersed precursor solution to prepare nanoparticles; and washing and drying the nanoparticles to obtain the nanoparticles as powder.

According to an embodiment of the present invention, nickel or palladium nanoparticles may be prepared. Preferably, oleylamine may be used as the stabilizer and 1,2-propanediol may be used as the solvent to prepare the mixture solution. Preferably, for preparation of nickel nanoparticles, 0.5 to 5 equivalents of oleylamine is used, and for palladium nanoparticles, 2 to 4 equivalents is used. The term "equivalents" used herein refers to the amount of the substance that reacts with one mole of metal.

Then, a predetermined amount of a carbon support is added to the mixture solution and the resulting solution is stirred to prepare a dispersion. If desired (e.g., in case where the support is not completely dispersed only by stirring), ultrasonic dispersing may be performed additionally. In this case, the temperature of the solution may increase due to the ultrasonic dispersing and stirring may be required to continue until the solution is returned to normal temperature. Examples of the carbon support may include, but not limited to, carbon powder, carbon black, acetylene black, ketjen black, activated carbon, carbon nanotube, carbon nanofiber, carbon nanowire, carbon nanohorn, carbon aerogel, carbon xerogel, carbon nanoring, and any combination thereof.

Thereafter, a nickel or palladium precursor is dissolved in a solvent to prepare the precursor solution and the thus-obtained precursor solution is mixed with the dispersion and stirred to prepare a dispersed precursor solution. A preferable example of the precursor may include, but not limited to, palladium(II) acetylacetonate ($Pd(C_5H_7O_2)_2$), nickel(II) acetylacetonate ($Ni(C_5H_7O_2)_2$), nickel(II) chloride ($NiCl_2$), and nickel(II) chloride hexahydrate ($NiCl_2.H_2O$). Preferably, 1,2-propanediol may be used as the solvent. A suitable amount of 1,2-propanediol is 300 mL or less per 0.1 g of palladium (or nickel). Compared to standard redox potential of palladium, nickel has a relatively low redox potential. Reduction of the low concentration of nickel precursor, which means the large volume of solvent, results in incomplete reduction because low concentration of metal precursor is directly connected to the negative shift in the reduction potential of nickel precursor. A preferred concentration of the nickel precursor is 3.4 mM. The amount of the nickel or palladium precursor can be determined according to the loading amount of the nickel or palladium to be supported on the carbon support. Preferably, the loading amount of metal (nickel, palladium) may be 5 to 90 wt % relative to a carbon support. The solution in which metal precursor is dissolved is introduced to the previously prepared solution with dispersed carbon powder and is mixed by stirring, preferably, for at least 2 hours.

Then, ultrasonic dispersing is performed for a short time, e.g., 1 to 5 minutes, which prevents precipitation and agglomeration of the support in the solvent. If the ultrasonic dispersing is performed for a long time, reduction of the precursor may occur due to local heating. After the ultrasonic dispersing, suitably, nitrogen or argon is introduced to prevent penetration of water and oxygen in the air, thereby preventing formation of oxides.

Subsequently, trace water contained in the dispersed precursor solution is evaporated at a temperature of, preferably, 100 to 130° C. If water evaporation is not performed, metal oxides can easily be formed since the nanoparticles are highly reactive during nucleation and particle growth. If the temperature of the solution is too high, the metal precursor may be reduced by 1,2-propanediol.

Next, the metal precursor in the dispersed precursor solution is reduced to prepare nanoparticles. For instance, sodium borohydride ($NaBH_4$) may used as a reducing agent. Sodium borohydride dissolved in 1,2-propanediol is introduced within a short time to the dispersed precursor solution while vigorously stirring. In this case, a preferable amount of the solvent 1,2-propanediol is 10 to 20 vol % of the entire solution. While sodium borohydride is dissolved in 1,2-propanediol, sodium borohydride reacts with 1,2-propanediol to generate hydrogen gas. Thus, it is preferred that the dissolution is carried out quickly through stirring. After the dissolution, the solution is introduced to the dispersed precursor solution as quickly as possible while stirring vigorously. The quick introduction and vigorous stirring are to reduce the number of crystal nuclei resulting from abrupt nucleation and thus to attain narrow particle size distribution. Preferably, the reduction using sodium borohydride is performed for at least 2 hours at 100 to 130° C. Then, the resulting nanoparticles are cooled spontaneously in the air.

Thereafter, the nanoparticles are washed and dried to obtain them as powder. The stabilizer is removed through this procedure. Washing is performed using acetone and ethanol in sequence, while filtering. If desired, following the ethanol washing, washing with deionized (DI) water may further be carried out. Contact with water during washing following the reduction in the organic solvent may result in oxidation on the surface of the nanoparticles and particle agglomeration, which may be detectable even by the laboratory X-ray diffraction equipment. Accordingly, washing with water is undesirable when the prepared nanoparticles are used in further synthesis process. After the washing, the nanoparticles are dried in a vacuum oven under an argon atmosphere to obtain them as powder.

While nickel or palladium nanoparticles are prepared according to the above-described embodiment, other metal nanoparticles and alloy nanoparticles may also be prepared according to the present invention. The alloy nanoparticles include not only uniform solid solutions but also surface alloy nanoparticles with a layer of a metal formed thereon. The additional metal element contained in the alloy nanoparticles may be any transition metal.

EXAMPLE

The example will now be described. The following example is for illustrative purposes only and not intended to limit the scope of the present invention.

28.6 wt % (metal content) Pd/C and 21.1 wt % Ni/C electrode materials were prepared. In brief, given the same nanoparticle size, the number of particles are the same as that for 40 wt % platinum.

In more detail, first, oleylamine (TCI, 220 μL) was added to 1,2-propanediol (99.5%, Aldrich, 100 mL) and stirred for 30 minutes. Then, after adding a carbon support (Cabot, Vulcan XC-72R, 0.15 g), stirring for 30 minutes, ultrasonic dispersing for 30 minutes and stirring again for 30 minutes were carried out. Nickel acetylacetonate ($Ni(C_5H_7O_2)_2$, 0.1843 g) or palladium acetylacetonate ($Pd(C_5H_7O_2)_2$, 0.1718 g) was dissolved in 1,2-propanediol (60 mL) and introduced to the carbon support solution while stirring. Then, the solution was sufficiently mixed by stirring for at least about 12 hours. Before heating the mixture solution, ultrasonic dispersing was performed for about 1 to 5 minutes. Then, the solution was introduced into a reactor and heated to 110° C. after making the atmosphere in the reactor with flowing argon gas to prevent penetration of air. The rate of heating the solution to 110° C. was set to ca. 2.2°/min. and it was controlled to take about 50 minutes to reach 110° C. By maintaining the temperature at 110° C. for 2 hours, there was given a sufficient time for the water vapor to be removed along with the flowing argon gas. After heating at 110° C. for 2 hours, sodium borohydride ($NaBH_4$) dissolved in 1,2-propanediol (20 mL) was introduced using an injector as quickly as possible. The solution was stirred vigorously at 850 rpm. The reducing agent was used in an amount of 5 equivalents both for palladium and nickel. Using 5 equivalents of sodium borohydride is adequate because the stabilizer oleylamine in the solution may form bidentate bonding with metal atom along with 1,2-propanediol and thereby result in incomplete reduction.

After adding the reducing agent, stirring was performed vigorously for about 30 minutes and then mildly for at least 1 hour and 30 minutes. Then, after cooling to normal temperature, nanoparticles were obtained as powder by washing in sequence with acetone and ethanol, filtering and drying in a vacuum oven at 40° C. for at least 6 hours.

Figure 2:
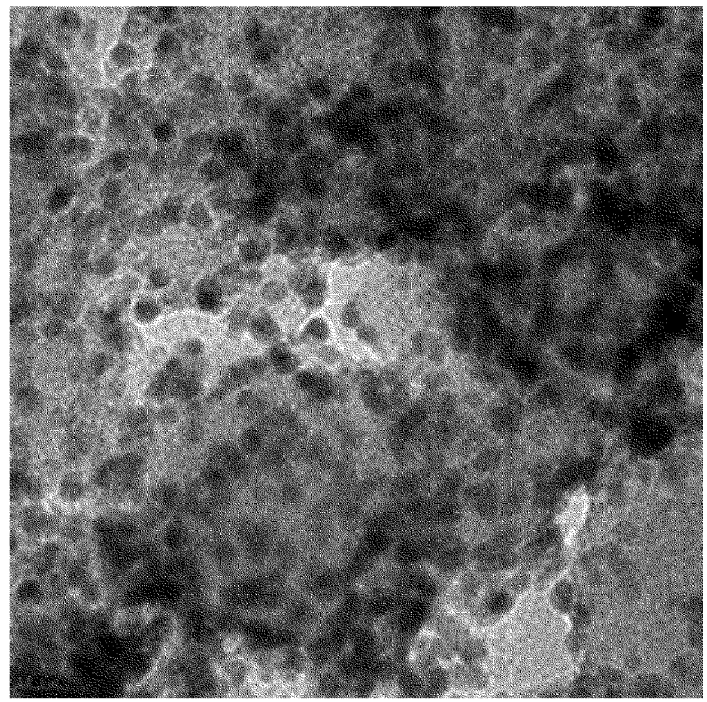
FIG. 2 (*a*) shows a transmission electron microscopy (TEM) image of 28.6 wt % Pd nanoparticles supported on carbon black.
Figure 2:
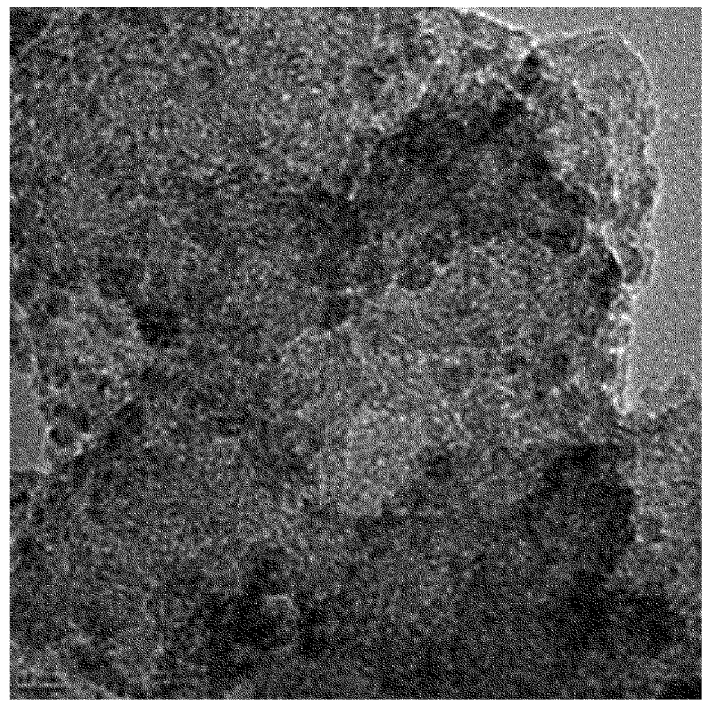

FIG. 2 (a) shows a transmission electron microscopy (TEM) image of the thus-prepared 28.6 wt % Pd/C electrode material. As seen from the figure, Pd nanoparticles with an average diameter of about 4 nm were obtained. Particle shape and distribution are very uniform in spite of the short inter-particle distance due to high loading. FIG. 2 (b) shows a TEM image of the thus-prepared 21.1 wt % Ni/C electrode material. Nickel with atomic number 28 is lighter than palladium, and hence shows rather indefinite particle shape in the TEM image as compared to palladium.

Figure 3:
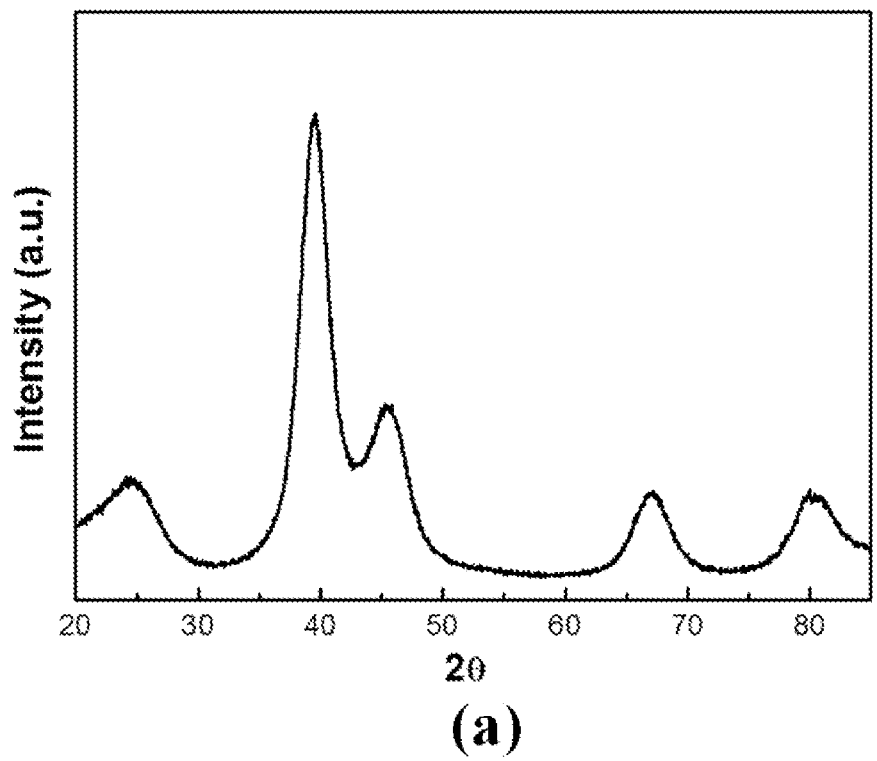
FIG. 3 (*a*) shows a powder diffraction pattern of 28.6 wt % Pd nanoparticles.
Figure 3:
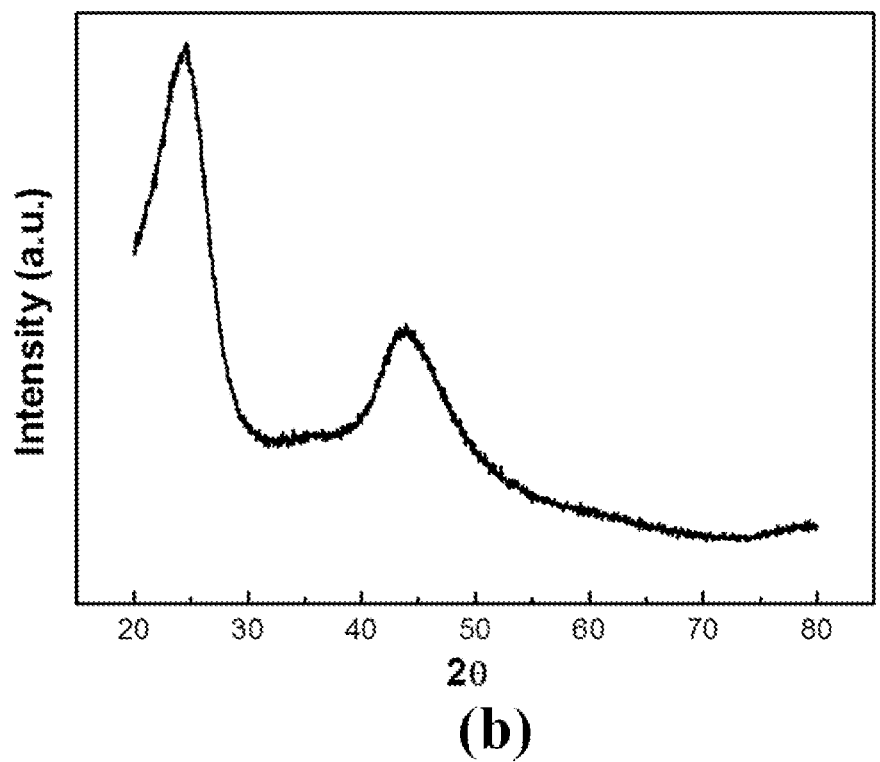

FIG. 3 shows powder X-ray diffraction patterns of the palladium (a) and nickel (b) electrode material. Whereas palladium (a) shows clear crystal peaks, nickel (b) exhibits highest intensity at the carbon powder diffraction peak (~24.5°). In case of nickel, amorphous structure with low crystal regularity may be formed easily during the reduction and particle growth. As a result, as seen in the diffraction pattern, clear peaks corresponding to the crystal planes are not observed. However, the absence of nickel oxide peaks reveals that very pure metallic nickel was prepared. The broad diffraction pattern around 33 to 36° is thought to be that of oxide formed on the surface during the X-ray diffraction measurement.

While the present invention has been described with respect to the specific embodiments, it will be apparent to those skilled in the art that various changes and modifications may be made without departing from the spirit and scope of the invention as defined in the following claims.

What is claimed is:

1. A method for preparing metal nanoparticles, comprising:
    dissolving an oleylamine in 1,2-propanediol to prepare a mixture solution;
    adding a carbon support to the mixture solution and stirring to prepare a dispersed mixture solution;
    dissolving a metal precursor in 1,2-propanediol to prepare a precursor solution, and adding the precursor solution into the dispersed mixture solution and stirring to prepare a dispersed precursor solution;
    ultrasonically dispersing the dispersed precursor solution;
    evaporating trace water contained in the dispersed precursor solution;
    reducing the metal precursor in the dispersed precursor solution to prepare nanoparticles; and
    washing and drying the nanoparticles to obtain the nanoparticles as powder.

2. The method according to claim 1, wherein the carbon support is one or more selected from carbon powder, carbon black, acetylene black, ketjen black, activated carbon, carbon nanotube, carbon nanofiber, carbon nanowire, carbon nanohorn, carbon aerogel, carbon xerogel and carbon nanoring.

3. The method according to claim 1, wherein sodium borohydride is used as a reducing agent in said reducing.

4. The method according to claim 1, wherein the metal is nickel or palladium.

5. The method according to claim 4, wherein the metal is nickel and about 0.5 to 5 equivalents of oleylamine is used.

6. The method according to claim 4, wherein the metal is palladium and about 2 to 4 equivalent of oleylanine is used.

7. The method according to claim 4, wherein the step of dissolving a metal precursor in 1,2-propanediol to prepare a precursor solution comprises using about 300 mL or less of 1,2-propanediol per 0.2 g of palladium or nickel.

8. The method according to claim 4, wherein the metal is selected from the group consisting of palladium(II) acetylacetonate (Pd(C5H7O2)2), nickel(II) acetylacetonate (Ni($C_5H_7O_2$)$_2$), nickel(II) chloride ($NiCl_2$), and nickel(II) chloride hexahydrate ($NiCl_2.H_2O$).

* * * * *